United States Patent [19]

Röhrig et al.

[11] Patent Number: 4,600,333
[45] Date of Patent: Jul. 15, 1986

[54] POLYMERIC COMPONENT

[75] Inventors: Harald Röhrig, Bonn; Günther Rudolf, Höchstadt, both of Fed. Rep. of Germany

[73] Assignee: INA Walzlager Schaeffler KG, Fed. Rep. of Germany

[21] Appl. No.: 698,809

[22] Filed: Feb. 6, 1985

[30] Foreign Application Priority Data

Mar. 29, 1984 [DE] Fed. Rep. of Germany ....... 3411640

[51] Int. Cl.⁴ .............................................. F16B 9/00
[52] U.S. Cl. .................................. 403/259; 403/269; 403/360; 474/903
[58] Field of Search ............... 403/259, 360, 356, 260, 403/261, 269, 266, 267, 404, 365, 355; 474/903; 416/241 A, 244 R, 214 R; 301/63 PW; 152/323, 385, 397, 400

[56] References Cited

U.S. PATENT DOCUMENTS

| 687,721 | 12/1901 | Bryant | 152/385 |
| 3,415,550 | 12/1968 | Golden | 403/259 |
| 3,622,249 | 11/1971 | Hayashi et al. | 416/244 |
| 4,105,343 | 8/1978 | Riegler et al. | 403/356 |
| 4,147,470 | 4/1979 | Brook et al. | 416/241 A |
| 4,326,849 | 4/1982 | Van Zijderveld | 403/365 |
| 4,417,855 | 11/1983 | Jepsen | 403/365 |

Primary Examiner—Cornelius J. Husar
Assistant Examiner—Peter M. Cuomo
Attorney, Agent, or Firm—Bierman, Peroff & Muserlian

[57] ABSTRACT

A polymeric component (1) having a bore (2) to receive a shaft (3), the component (1) having, in the zone (4) around the bore (2), substantially plane and parallel end faces disposed perpendicular to the bore axis, the component being clamped between substantially radial abutment surfaces (5,6) of the shaft (3), characterized in that a number of axially continuous metal pins (7) distributed over the periphery are disposed in the zone (4) around the bore (2) and bear by their ends on the abutment surfaces (5,6) and a method of producing the same.

8 Claims, 3 Drawing Figures

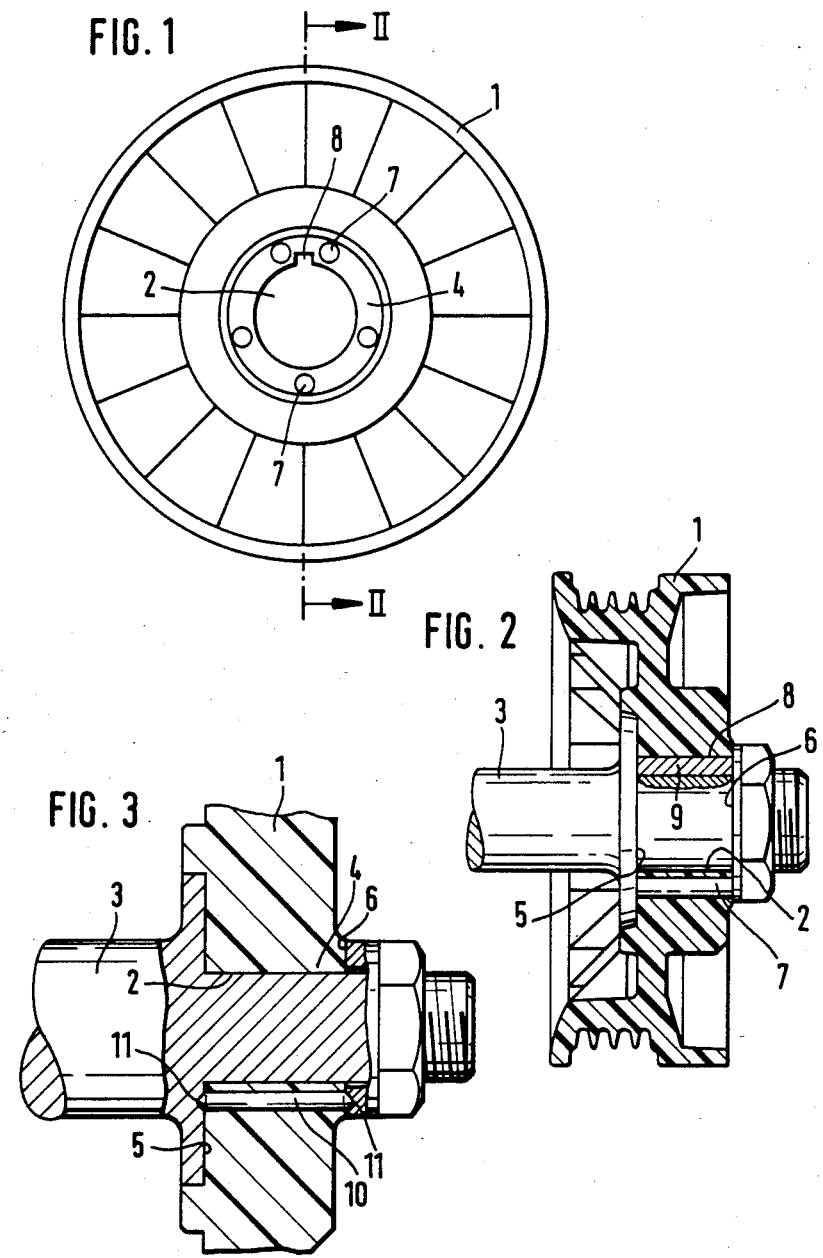

POLYMERIC COMPONENT

STATE OF THE ART

Polymer components formed with a bore to receive a shaft and having, in the zone around the bore, substantially plane and parallel end faces disposed perpendicularly to the bore axis, the component being clamped between substantially radial abutment surfaces of the shaft are known. It is usually difficult to ensure a tight fit when components of this type are clamped between substantially radial abutment surfaces of the shaft due to shrinkage of the polymeric substance because of cold flow property or of changes in temperature. A component of this kind, which is required to transmit torques, as for instance in the case of pulleys or tensioning rollers, is very likely to fail prematurely.

To obviate such failures, it has been suggested that either the bore itself or the zone there around be reinforced with sheet-metal members which can be surrounded by polymeric material by injection-moulding or which can be introduced subsequently to ensure reliable retention but the sheet-metal members have to be separately produced in corresponding tools for each individual case so that initial costs are increased considerably.

OBJECTS OF THE INVENTION

It is an object of the invention to provide novel improved components of the type specified which can be clamped reliably by very simple means between the abutment surfaces of a shaft.

This and other objects and advantages of the invention will become obvious from the following detailed description.

THE INVENTION

The novel polymeric component of the invention having a bore (2) to receive a shaft (3), the component (1) having, in the zone (4) around the bore (2), substantially plane and parallel end faces disposed perpendicular to the bore axis, the component being clamped between substantially radial abutment surfaces (5,6) of the shaft (3), is characterized in that a number of axially continuous metal pins (7) distributed over the periphery are disposed in the zone (4) around the bore (2) and bear by their ends on the abutment surfaces (5,6).

This feature is an advantageous way of providing reliable clamping with the resulting operative connection being adequate to transmit a torque since the metal pins take the clamping force. With regard to the hardness of the polymeric substance used, the length of the metal pins is adapted to individual cases so that the component is received by its end faces without backlash between the abutment surfaces of the shaft to obviate axial movement and consequent premature wear.

According to another feature of the invention, the pin ends are reduced as compared with the full pin cross-section and more particularly have points or cutting edges. The advantage of this feature is that the pin ends press into the shaft abutment surfaces on clamping so that a positive connection is obtained enabling an increased torque to be transmitted.

According to another feature of the invention, the bore is formed with a keyway and metal pins are disposed one on each side of the keyway in the immediate vicinity thereof. This feature is very convenient when the keyway serves not only for location for assembly but also for torque transmission since the metal pins oppose peripheral distortion of the keyway.

In a process for the production of a polymeric component, the metal pins are surrounded by the polymeric substance by casting or injection-moulding. In another process for the production of a polymeric component, the metal pins are introduced into the bores subsequently.

Referring now to the drawings:

FIG. 1 is an elevation view of a V-belt pulley of the invention;

FIG. 2 is a longitudinal cross-section along line II—II of FIG. 1 with the pulley being mounted on a shaft and FIG. 3 is a partial longitudinal cross-section through another embodiment of the invention.

A V-belt pulley 1 has a bore 2 to receive a shaft 3 and is clamped in the zone 4 around bore 2 between radial abutment surfaces 5 and 6 of shaft 3. As FIGS. 1 and 2 show, a number of peripherally distributed axially continuous metal pins are disposed in zone 4 around bore 2 and bear by their ends on abutment surfaces 5 and 6. A keyway 8 is present in bore 2 and metal pins 7 are provided one on side of the keyway in the immediate vicinity thereof. A key 9 is received in a recess in shaft 3 and also engages in keyway 8.

In the embodiment of FIG. 3, metal pins 10 have at their end points 11 pressed into abutment surfaces 5 and 6 of shaft 3.

Various modifications of the polymeric component of the invention may be made without departing from the spirit or scope thereof and it is to be understood that the invention is intended to be limited only as defined in the appended claims.

What we claim is:

1. A polymeric component (1) having a bore (2) to receive a shaft (3), the component (1) having, in a zone (4) around the bore (2), substantially planar and parallel end faces disposed perpendicular to the axis of the bore, the component being clamped between substantially radial abutment surface (5,6) characterized in that a number of axially continuous metal pins (7) are distributed radially outward of said of the bore (2) and are disposed in the zone (4) around the bore (2) and bear by their ends on the abutment surface (5,6).

2. A polymeric component (1) of claim 1 wherein the ends of the metal pins (10) are reduced as compared with the full pin cross-section.

3. A polymeric component of claim 2 wherein the ends of the metal pins have points (11).

4. A polymeric component (1) of claim 1 wherein the bore (2) is formed with a keyway (8) and metal pins (7) are disposed one on each side of the keyway in an immediate vicinity thereof.

5. A process for the production of a polymeric component (1) of claim 1 characterized in that the metal pins (7) are surrounded by the polymeric substance by injection-moulding.

6. A process for the production of a polymeric component (1) of claim 1 characterized in that the metal pins (7) are subsequently introduced into bores.

7. A polymeric component of claim 2 wherein the ends of the metal pins have cutting edges.

8. A process for the production of a polymeric component (1) of claim 1 wherein the metal pins (7) are surrounded by the polymeric substance by casting.

* * * * *